(12) United States Patent
Yamagishi (10) Patent No.: US 9,738,448 B1
(45) Date of Patent: Aug. 22, 2017

(54) MULTITASKING CRANE (71) Applicant: JB-Create, Inc., Ishikawa (JP)

(72) Inventor: Juro Yamagishi, Ishikawa (JP)

(73) Assignee: JB-Create, Inc., Ishikawa (JP)

( * ) Notice: Subject to any disclaimer, the term of this patent is extended or adjusted under 35 U.S.C. 154(b) by 0 days.

(21) Appl. No.: 15/417,306

(22) Filed: Jan. 27, 2017

(30) Foreign Application Priority Data

Nov. 28, 2016 (JP) .................................. 2016-229850

(51) Int. Cl.
*G06F 7/00* (2006.01)
*B65G 1/04* (2006.01)

(52) U.S. Cl.
CPC ......... *B65G 1/0435* (2013.01); *B65G 1/0421* (2013.01)

(58) Field of Classification Search
USPC ........................................................ 700/218
See application file for complete search history.

(56) References Cited

U.S. PATENT DOCUMENTS

2013/0209202 A1* 8/2013 Schmit ..................... B65G 1/06
414/279

FOREIGN PATENT DOCUMENTS

| JP | 5382452 B2 | 1/2014 |
| JP | 5976388 B2 | 8/2016 |
| JP | 2016-155659 A | 9/2016 |

* cited by examiner

*Primary Examiner* — Kyle Logan
(74) *Attorney, Agent, or Firm* — Nakamishi IP Associates, LLC (57) ABSTRACT

A multitasking crane includes a travelling device, load tables that are lifted and lowered independently of each other and disposed in two columns arranged in a travelling direction and at least one transfer device that is provided on each of the load tables and is configured to deliver the merchandise trays. The transfer device of the load table for picking is actuated to pick at least one of the merchandise trays that has been specified, and at the same time, at least one of the merchandise trays that is previously placed on the transfer device of the load table for storage is moved to empty one of the storage shelves of the automated warehouse and stored.

1 Claim, 7 Drawing Sheets

MULTITASKING CRANE

BACKGROUND

Technical Field

The present invention relates to a crane used to store and pick merchandise trays in/from shelves of an automated warehouse.

Related Art

In conventional automated warehouses, comparatively large amount of articles of the same type are housed in cases and stored in shelves (JP 5382452 B2 and JP 5976388 B2).

In electronic commerce, which significantly grows particularly in recent years, there is a sales technique called the long tail. In the technique, many types of merchandise including ones generating low sales are stocked and customers support the technique. However, for management of inventory of huge types of merchandise in contrast to types of merchandise in conventional store commerce, shelves for storing the merchandise requires vast space, and picking merchandise generates work requiring long time walk between the shelves, which is not efficient. Conventionally, there are known automated warehouses capable of storing merchandise in cases. However, in those automated warehouses, a case is taken out and then a replenishing case is stored, which makes the automated warehouses unsuitable for loose selling of many types and small amount of merchandise from the viewpoint of productivity. Thus, in order to secure space productivity and picking productivity by tray-storing many types of merchandise in high rack shelves having high space productivity, more efficiency such as increasing speed of case processing of a stacker crane is required.

There are many stacker cranes similar to those described in JP 5382452 B2 and JP 5976388 B2. However, such a stacker crane has to move to a conveyor as a base point every time when storing and picking operations have completed, limiting operation efficiency even when travelling speed of the crane and storing/picking speed of transfer devices are increased.

SUMMARY

One or more aspects of the present invention are directed to a crane for an automated warehouse capable of efficiently storing and picking merchandise trays.

One or more aspects of the present invention relate to a multitasking crane used to store and pick merchandise trays in/from storage shelves of an automated warehouse, the multitasking crane comprising a travelling device, load tables that are lifted and lowered independently of each other and disposed in two columns arranged in a travelling direction, and at least one transfer device that is provided on each of the load tables and is configured to deliver the merchandise trays, wherein a first load table of the load tables is assigned to be a load table that exclusively performs a picking operation and a second load table of the load tables is assigned to be a load table for storage that exclusively performs a storing operation, the transfer device of the load table for picking is actuated to pick at least one of the merchandise trays that has been specified, and at the same time, at least one of the merchandise trays that is previously placed on the transfer device of the load table for storage is moved to empty one of the storage shelves of the automated warehouse and stored.

In the above aspects of the present invention, the transfer devices for delivering the merchandise trays may be provided at two positions on left and right of each of the load tables assuming that the travelling direction of the multitasking crane is a left and right direction.

Further, in the above aspects of the present invention, the left load table of the load tables disposed in the two columns may be assigned to be the load table for picking and the right load table of the load tables is assigned to be the load table for storage. In this case, the load table for storage may be moved to the storage shelf of the corresponding column of the automated warehouse and at least one of the merchandise trays that is previously placed on the left transfer device of the load table for storage may be stored at the same time as the left transfer device of the load table for picking picks at least one of the merchandise trays, and the load table for storage may be moved to the storage shelf of the corresponding column of the automated warehouse and at least one of the merchandise trays that is previously placed on the right transfer device of the load table for storage may be stored at the same time as the right transfer device of the load table for picking picks the at least one of the merchandise trays.

According to the multitasking crane of the aspects of the present invention, picking and storing operations can be performed at the same time. Thus, the multitasking crane of the present invention has advantages of high efficiency and extremely enhancing productivity by efficiently storing and picking a large number of merchandise trays in short time.

In addition, since the transfer devices for delivering the merchandise trays are provided at two positions on left and right of each of the load tables. Thus, storing and picking operations can be performed twice during one set of going and returning from/to a merchandise tray delivering position, and thus enhancing operation efficiency. Further, according to the multitasking crane of the aspect of the present invention, search of a storing position and a storing operation can be performed efficiently during a picking operation.

DETAILED DESCRIPTION

Figure 1:
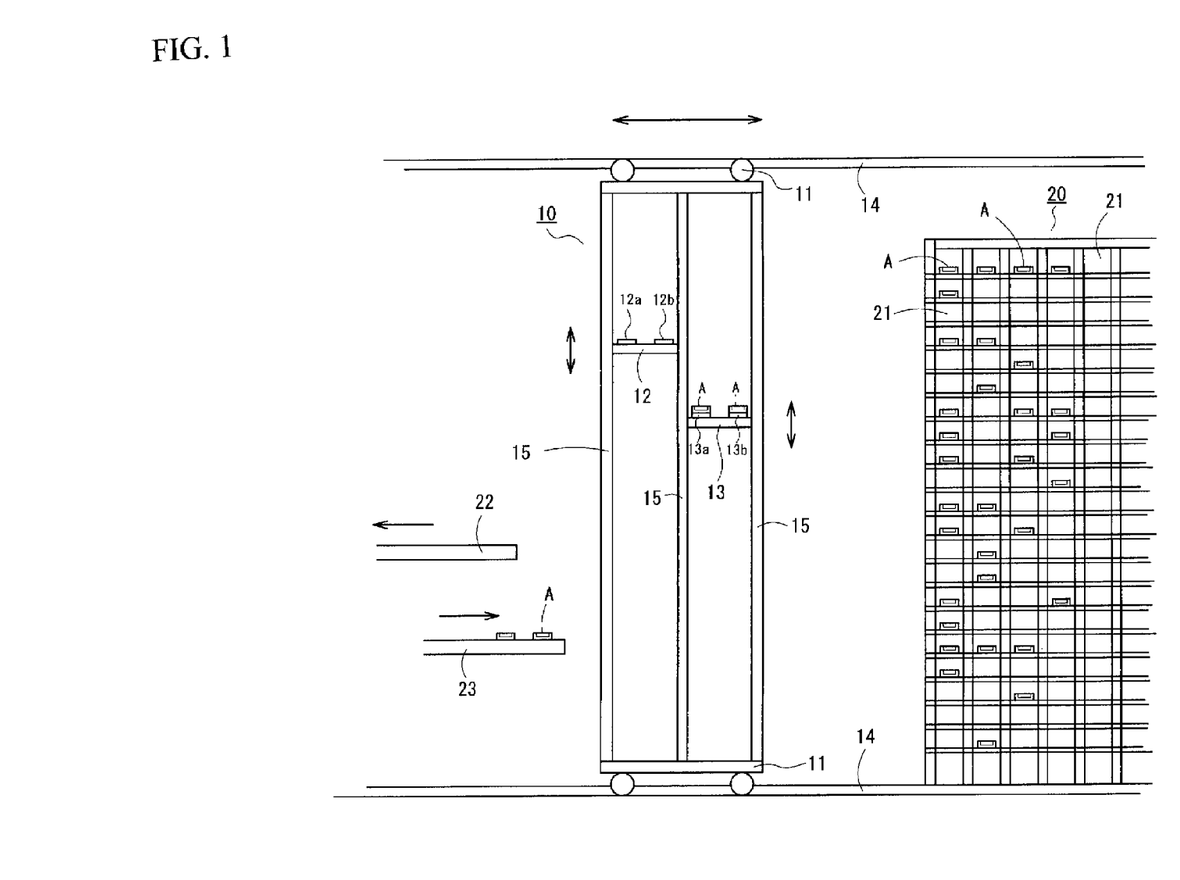
FIG. 1 is a schematic front view illustrating an embodiment of a multitasking crane according to the present invention.
Figure 2:
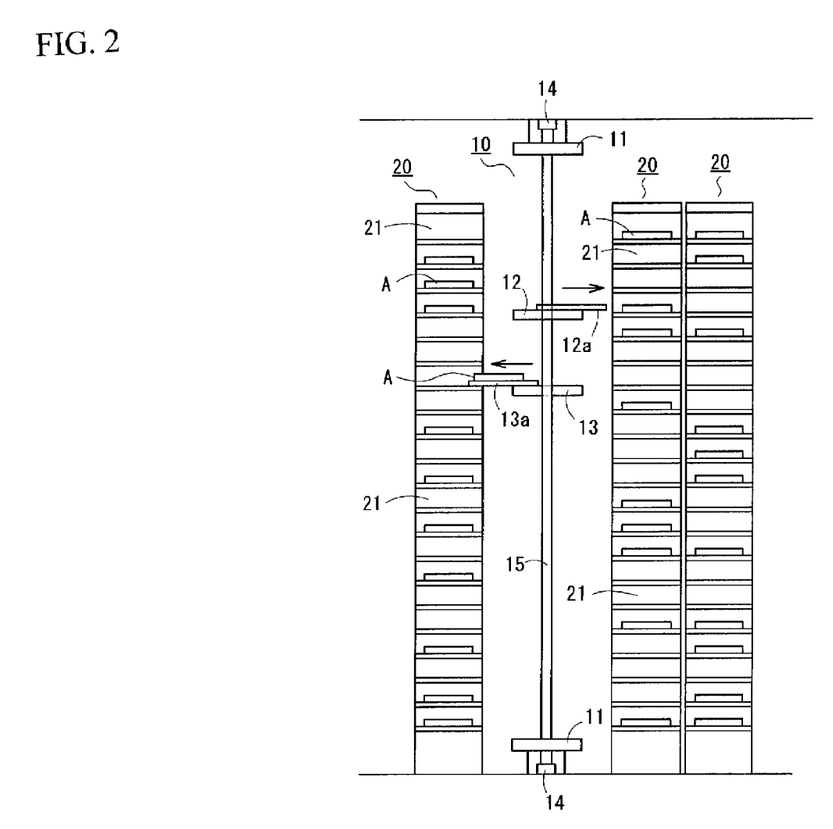
FIG. 2 is a schematic side view illustrating the embodiment of the multitasking crane according to the present invention.
Figure 3:
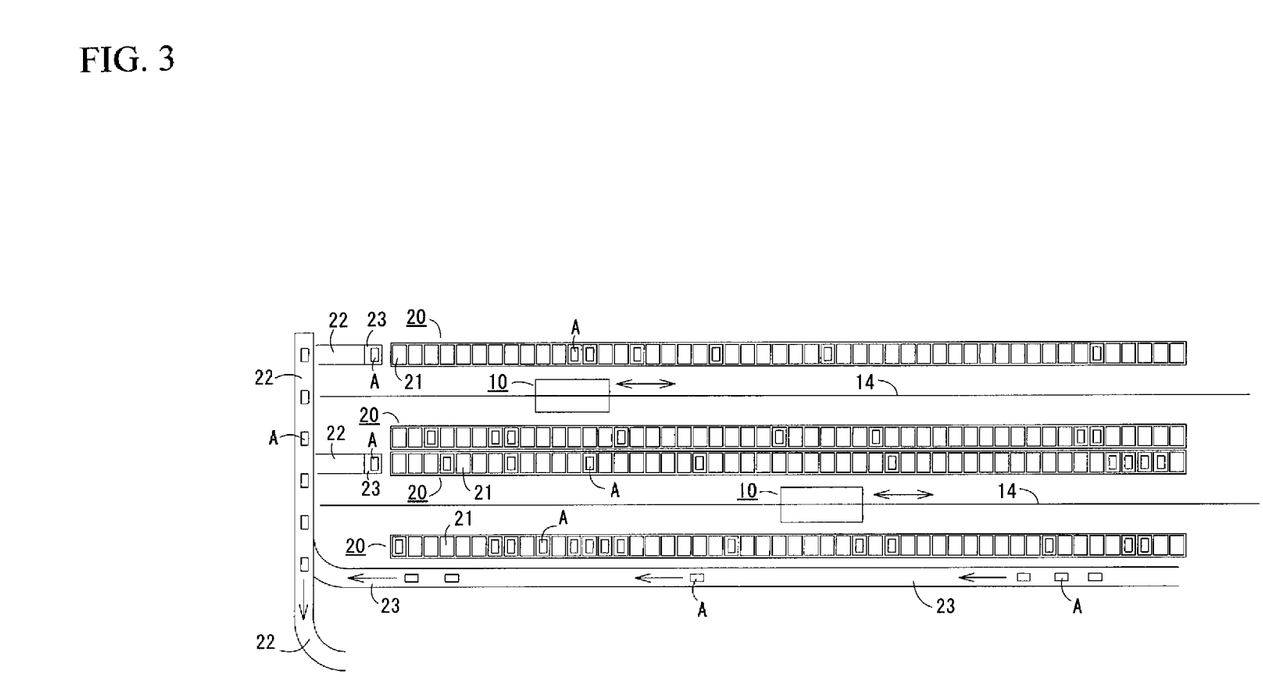
FIG. 3 is a schematic plan view illustrating the embodiment of the multitasking crane according to the present invention.

An exemplary embodiment of the present invention is hereinafter described in further detail with reference to the accompanying drawings. FIG. 1 is a schematic front view of a multitasking crane; FIG. 2 is a schematic side view of the multitasking crane; FIG. 3 is a schematic plan view of a facility where the multitasking crane is used; and FIGS. 4 to 7 are views illustrating examples of operations of the multitasking crane.

A multitasking crane 10 travels between adjacent automated warehouses 20 installed in a plurality of parallel rows as illustrated in FIGS. 1 to 3, and stores/picks merchandise trays A having the same size in/from storage shelves 21 provided in the automated warehouses 20. The multitasking crane 10 includes travelling devices 11 travelling on rails 14, a load table for picking 12, and a load table for storage 13. The load table for picking 12 includes transfer devices 12a and 12b that are disposed in two columns along the travelling direction to be independently lifted and lowered for picking a merchandise tray A. The load table for storage 13 includes transfer devices 13a and 13b for storing a merchandise tray A. The transfer device 12a of the load table for picking 12 picks a merchandise tray A and, at the same time, the transfer device 13a of the load table for storage 13 stores a merchandise tray A.

Note that a system for storing, picking, and conveying merchandise trays A in a facility including the multitasking crane 10 and the automated warehouses 20 is controlled and managed by a computer, and operated automatically excluding some parts. In addition, the merchandise trays A each have an IC tag or a bar code attached thereon and are managed by the computer.

The multitasking crane 10 includes the travelling devices 11, masts 15, the load table for picking 12, and the load table for storage 13. The travelling devices 11 automatically travel on the rails 14 installed in upper and lower parts of the facility. The masts 15 connect the upper and lower travelling devices 11. The load table for picking 12 includes the transfer devices 12a and 12b for picking merchandise trays A from the storage shelves 21 of the automated warehouses 20 with guide by the masts 15 and is lifted and lowered. The load table for storage 13 includes the transfer devices 13a and 13b for storing merchandise trays A and is lifted and lowered. In this embodiment, a case where each of the load tables includes two transfer devices is described. However, the number of transfer devices on each of the load tables may be varied to one, four, or the like according to convey efficiency or cost as required for a warehouse.

The transfer devices 12a, 12b, 13a, and 13b have the same structure. When the automated warehouses 20 are installed such that they face corresponding warehouses 20 positioned across the multitasking crane 10 as illustrated in FIG. 2, the transfer devices 12a, 12b, 13a, and 13b can move in both directions, and thus increasing storing/picking efficiency. Regarding the shape of the multitasking crane 10, the shapes of the travelling devices and the masts and the shapes of the load tables and the transfer devices may be preferably determined according to scale and a configuration of each facility and a shape of merchandise trays A.

In the multitasking crane 10 according to the present embodiment, the transfer device 13a stores at the same time as the transfer device 12a picks, and the transfer device 13b stores at the same time as the transfer device 12b picks.

The automated warehouses 20 include the storage shelves 21 for storing the merchandise trays A. The storage shelves 21 are installed such that they face corresponding storage shelves positioned across the multitasking crane 10.

For the automated warehouses 20, a pick tray conveyor 22 for conveying-out picked merchandise trays A and a replenishing tray conveyor 23 for conveying-in merchandise trays A are provided at one end of the automated warehouses 20. The multitasking crane 10 is configured to transport a merchandise tray A placed on the replenishing tray conveyor 23 to the load table for storage 13 so as to store the merchandise tray A in a warehouse, and transport a merchandise tray A picked by the load table for picking 12 to the pick tray conveyor 22 so as to convey-out the merchandise tray A. The pick tray conveyor 22 and the replenishing tray conveyor 23 are arranged such that the Multitasking crane 10 can perform storing and picking operations at the same time.

Next, a series of operations performed by the multitasking crane 10 is described with reference to FIGS. 4 to 7. In the present embodiment, the multitasking crane 10 includes two transfer devices for each of the load tables. In order to distinct the merchandise trays, a merchandise tray to be picked by the transfer device 12a is followed by a reference sign A1, a merchandise tray to be picked by the transfer device 12b is followed by a reference sign A2, a merchandise tray to be stored by the transfer device 13a is followed by a reference sign A3, a merchandise tray to be stored by the transfer device 13b is followed by a reference sign A4, and merchandise trays to be replenished for a following operation of the replenishing tray conveyor 23 during operation of the multitasking crane 10 are followed by reference signs A5 and A6.

Figure 4:
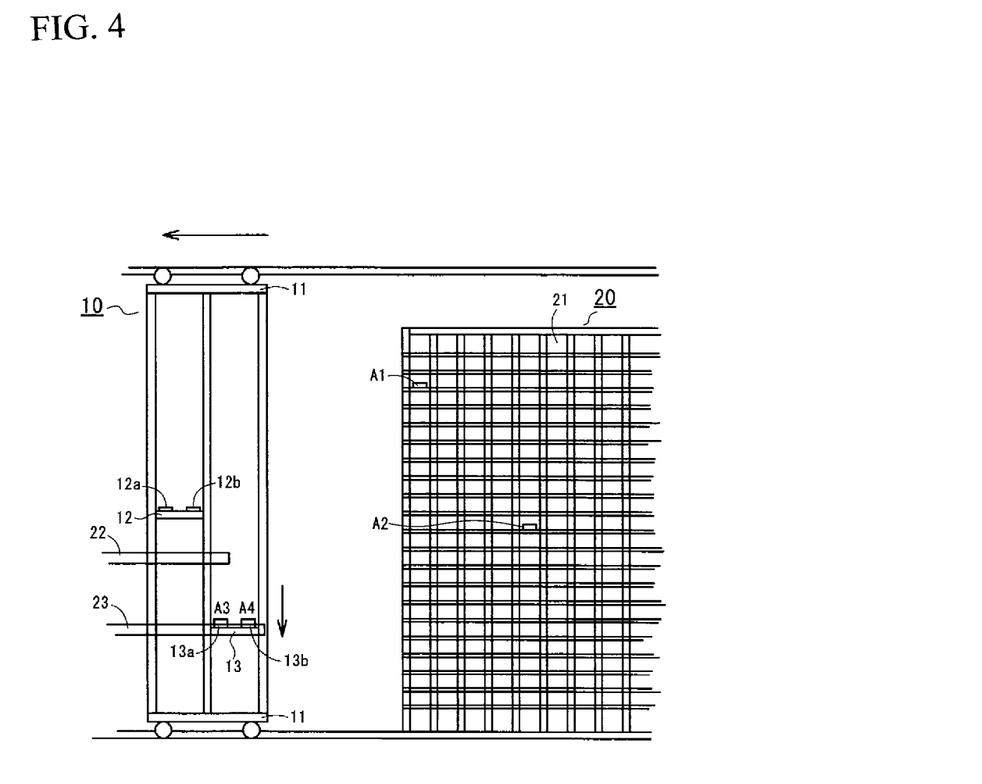
FIG. 4 is a view illustrating a series of operations performed by the multitasking crane according to the present invention.

First, in order to place a merchandise tray A on the load table for storage 13, the multitasking crane 10 moves to the replenishing tray conveyor 23, and the transfer devices 13a and 13b of the load table for storage 13 respectively catch merchandise trays A3 and A4 as illustrated in FIG. 4.

Figure 5A:
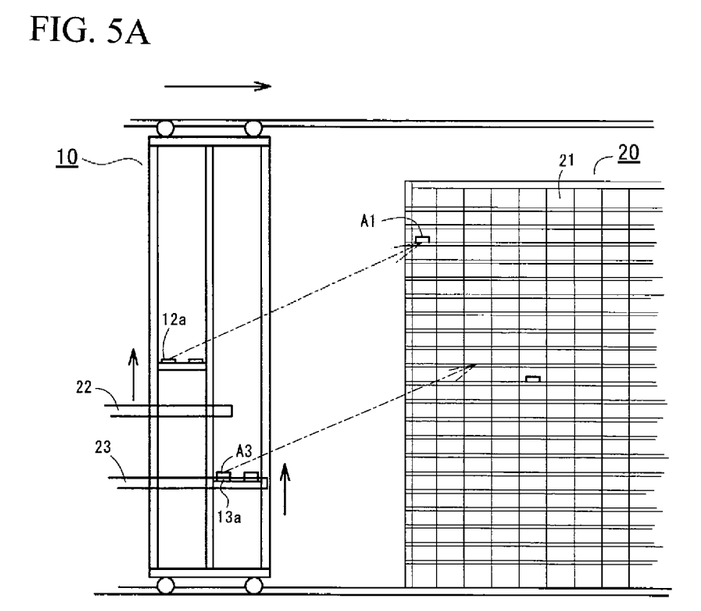
FIGS. 5A and 5B are views illustrating an example an operation of the multitasking crane according to the present invention.
Figure 5B:
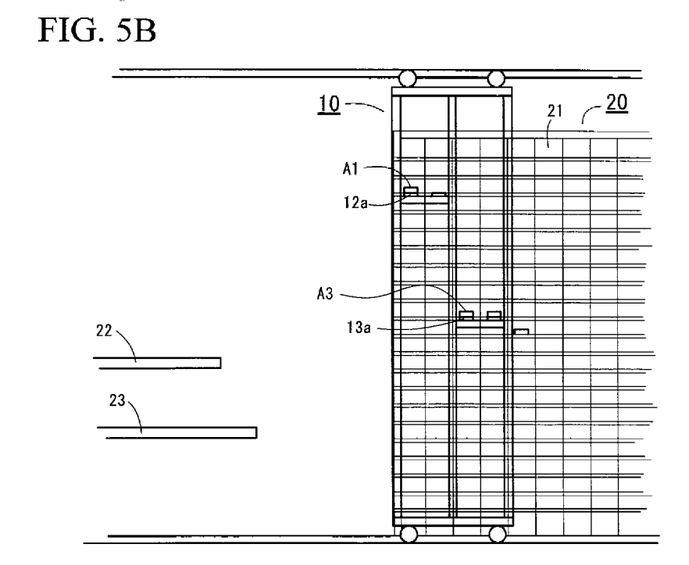

Second, in order that the transfer device 12a of the load table for picking 12 picks a merchandise tray A1 in a storage shelf 21, the travelling devices of the multitasking crane 10 move in a lateral direction in the drawing (travelling direction), and the load table for picking 12 is lifted or lowered as illustrated in FIGS. 5A and 5B. It is assumed here that the multitasking crane 10 has been instructed to pick the merchandise tray A1. At the same time, the transfer device 13a of the load table for storage 13 searches an empty storage shelf in a corresponding column of storage shelves 21 when the multitasking crane 10 completes moving, and the load table for storage 13 is lifted or lowered to the searched storage shelf 21.

The respective load tables complete moving to the storage shelves 21 for picking and storing, and the transfer devices are activated such that the transfer device 12a picks the merchandise tray A1, and the transfer device 13a stores the merchandise tray A3.

Figure 6A:
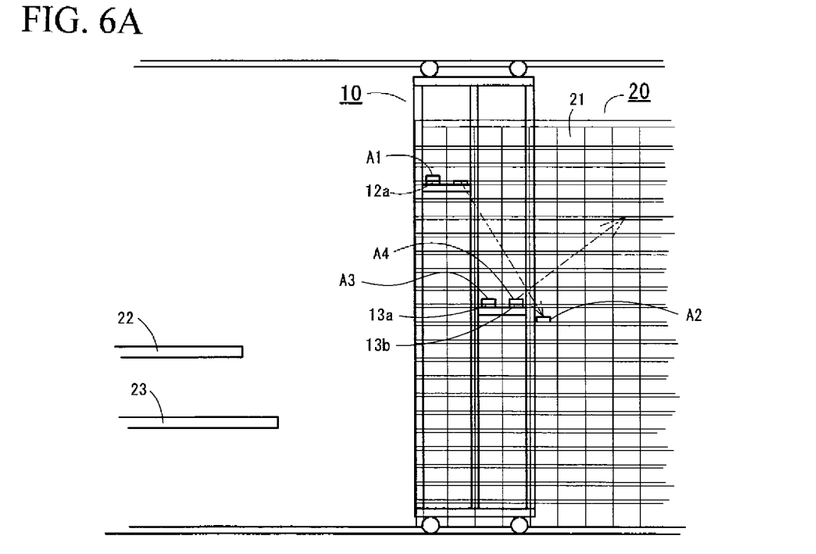
FIGS. 6A and 6B are views illustrating an example of an operation of the multitasking crane according to the present invention.
Figure 6B:
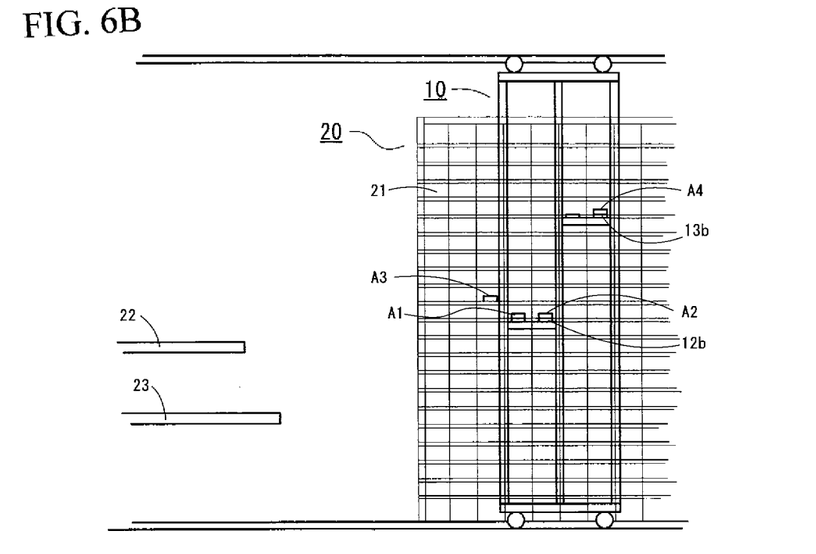

Third, similarly to the second operation, the multitasking crane 10 moves to the storage shelf 21 where a merchandise tray A2 to be picked by the transfer device 12b of the load table for picking 12 is stored and, at the same time, the transfer device 13b of the load table for storage 13 moves to an empty storage shelf in a corresponding column of storage shelves 21 as illustrated in FIGS. 6A and 6B. When the respective load tables complete moving, the transfer device 12b picks the merchandise tray A2 and the transfer device 13b stores the merchandise tray A4.

Figure 7:
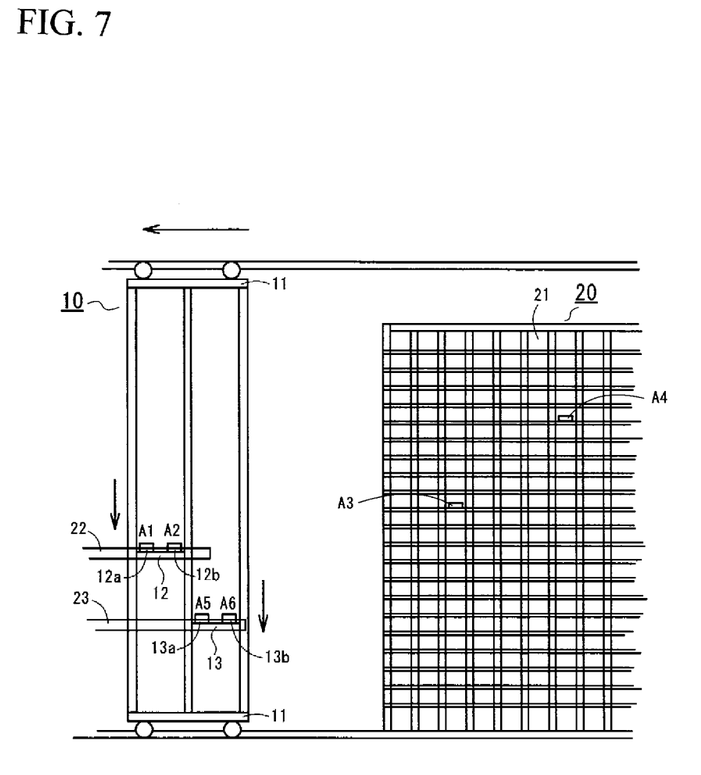
FIG. 7 is a view illustrating an example of an operation of the multitasking crane according to the present invention.

Forth, the load table for picking 12 of the multitasking crane 10 moves to the position of the pick tray conveyor 22, and the load table for storage 13 moves to the position of the replenishing tray conveyor 23 as illustrated in FIG. 7. The load table for picking 12 transports the merchandise trays A1 and A2, which have been picked, to the pick tray conveyor 22, and the load table for storage 13 places next merchandise trays A5 and A6, which have been waiting on the replenishing tray conveyor 23, on the load table for storage 13.

By repeating the second to fourth operations, storing and picking operations can be performed at the same time, and thus extremely enhancing operation efficiency of a crane.

As an example, when the multitasking crane 10 according to the present invention is applied to automated warehouses that provide processing capacity of 80 cases/H when a conventional crane that moves to a conveyor as a base point every time when storing and picking operations have completed, processing capacity of about 200 cases/H can be provided.

A multitasking crane according to one or more embodiments of the present invention is suitable for a system configured to manage an automated warehouse by housing various kinds of merchandise of small amount in merchandise trays. The multitasking crane can be efficiency used, for example, in an automated warehouse of ethical drugs.

The invention claimed is:

1. A multitasking crane used to store and pick merchandise trays in/from storage shelves of an automated warehouse comprising:
   a travelling device;
   load tables that are lifted and lowered independently of each other and disposed in two columns arranged in a travelling direction; and
   at least one transfer device that is provided on each of the load tables and is configured to deliver the merchandise trays,
   wherein a first load table of the load tables is assigned to be a load table that exclusively performs a picking operation and a second load table of the load tables is assigned to be a load table for storage that exclusively performs a storing operation, the transfer device of the load table for picking is actuated to pick at least one of the merchandise trays that has been specified, and at the same time, at least one of the merchandise trays that is previously placed on the transfer device of the load table for storage is moved to empty one of the storage shelves of the automated warehouse and stored;
   wherein the transfer devices for delivering the merchandise trays are provided at two positions on left and right of each of the load tables assuming that the travelling direction of the multitasking crane is a left and right direction; and
   wherein when the left load table of the load tables disposed in the two columns is assigned to be the load table for picking and the right load table of the load tables is assigned to be the load table for storage,
   the load table for storage is moved to the storage shelf of the corresponding column of the automated warehouse and at least one of the merchandise trays that is previously placed on the left transfer device of the load table for storage is stored at the same time as the left transfer device of the load table for picking picks at least one of the merchandise trays, and the load table for storage is moved to the storage shelf of the corresponding column of the automated warehouse and at least one of the merchandise trays that is previously placed on the right transfer device of the load table for storage is stored at the same time as the right transfer device of the load table for picking picks the at least one of the merchandise trays.

* * * * *